No. 888,134. PATENTED MAY 19, 1908.
C. W. WEST.
MANURE SPREADER.
APPLICATION FILED MAY 27, 1907.
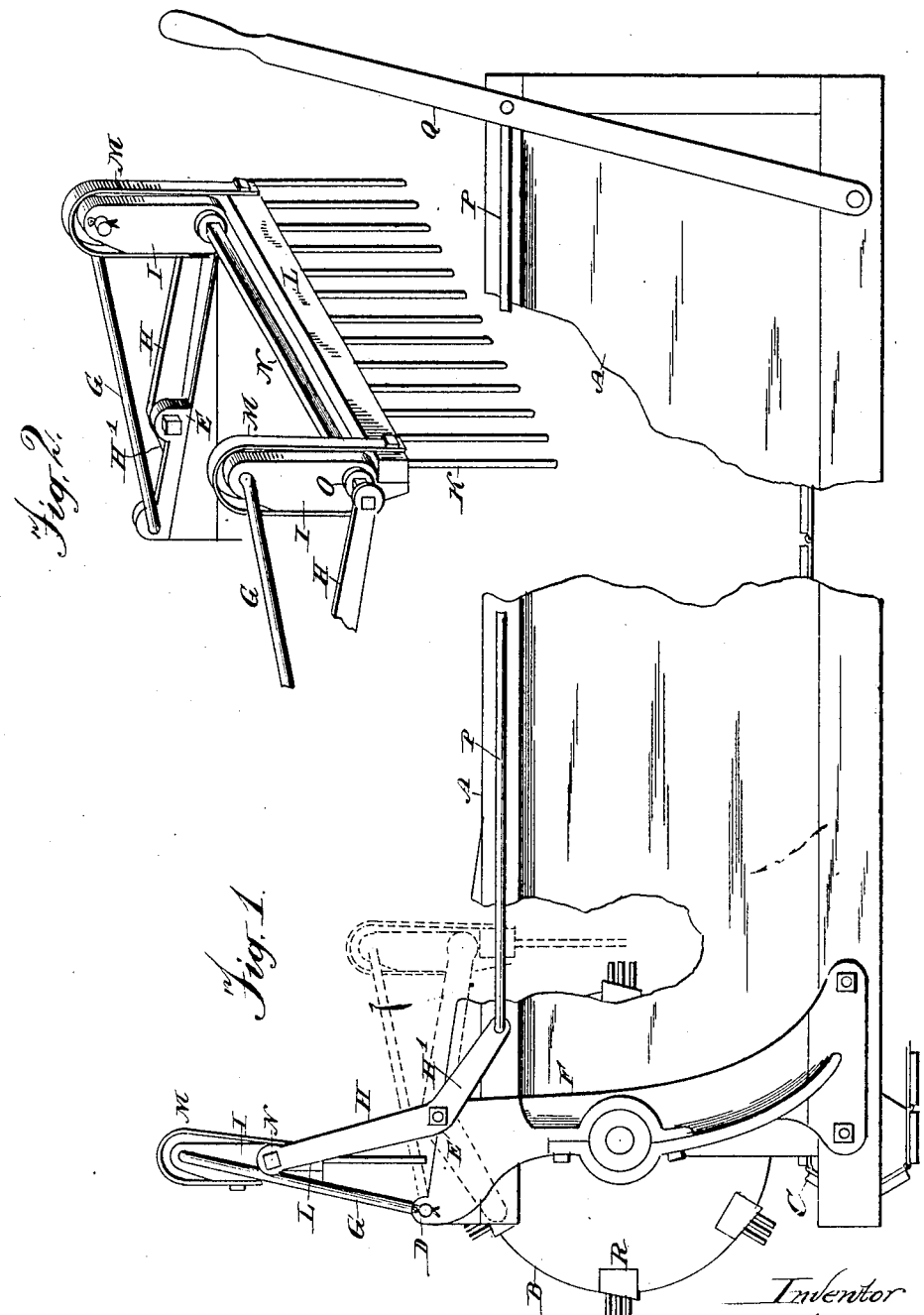
Witnesses
L. A. St. John.
N. P. McKee.
Inventor
Charles W. West
By J. M. St. John.
Atty.

UNITED STATES PATENT OFFICE.

CHARLES W. WEST, OF PIERRE, SOUTH DAKOTA, ASSIGNOR TO W. T. JONES, OF CEDAR RAPIDS, IOWA.

MANURE-SPREADER.

No. 888,134.    Specification of Letters Patent.    Patented May 19, 1908.

Application filed May 27, 1907. Serial No. 375,895.

*To all whom it may concern:*

Be it known that I, CHARLES W. WEST, a citizen of the United States, residing at Pierre, in the county of Hughes and State of South Dakota, have invented certain new and useful Improvements in Manure-Spreaders, of which the following is a specification.

This invention relates to that class of fertilizer distributers commonly known as manure spreaders; and has for its object to provide a device which serves in the double capacity of a retarding rake, and a backstop to prevent excessive crowding of the load against the beater.

A further object is to improve the form of the beater bar.

The nature of the invention will clearly appear from the description and claims following, reference being had to the accompanying drawings, in which:—

Figure 1 is a fragmentary side view of a manure spreader with my improvements applied thereto. Fig. 2 is a view in perspective, showing the device in detail.

In the operation of manure spreaders it is desirable to, in some manner, retard the flow of material as carried back by and over the beater. If this is not done there is a tendency to scatter the material unevenly, and in lumps or masses, especially if mixed with corn-stalks, straw, or other litter. So also there is a tendency on the part of the load to work back toward the beater, in moving out to the field, and so crowd upon it that the starting of the machine is difficult or dangerous. This invention is designed to remedy both defects, and by a device which alternately performs both functions.

Referring now to the drawing, A designates the box or body of a manure spreader of the usual type, provided with a beater B and apron or conveyer C. These are supposed to be driven by suitable mechanism, not shown.

In suitable bearings D and E, preferably forming a part of the casting F which supports the beater (one of which is provided for each side of the machine), is mounted a pair of arms or links G and H, respectively. For convenience the rear one may be called a link and the other an arm, one of each being provided for each side of the machine. These are pivotally connected with link-blocks I, and to these is connected a retarder, which is preferably in the nature of a rake, as shown.

The connection might be rigid, but in such a case the fingers should be elastic, since the retarder should yield somewhat to the material passing under it, when in the position shown in Fig. 1. In practice, however, I prefer to use rigid fingers K secured to a head L, and attach this head yieldingly to the link-blocks. A simple device for this purpose is a pair of stirrup-shaped springs M M bolted at one end of the link-block and at the other to the retarder head. The two arms H are coupled to form a bail by a square shaft N, and suitable thimbles O are provided for the link-blocks to turn on. One of the arms H has an extension H¹ and to this is connected a rod P extending to a hand-lever Q near the front end of the machine, and within convenient reach of the driver.

In position for loading, the retarder is down, as shown by the dotted outline in Fig. 1. The load is thus held back from the beater, and does not clog it in going out to the field. When ready to distribute, the operator throws the hand-lever forward, as shown, and the retarder takes the position directly over the beater shown in the full outline. While in this position the material passing under it will be more or less pulverized, and will finally be deposited on the ground in even and finely broken condition.

It will be noted that the device locks itself in both positions. Its movement downward is arrested by the upper edge of the machine body, on which the square shaft rests. When thrown back the links G lock it across the same shaft. In either position backward pressure against the retarder only locks it the tighter. At the same time the device may be freely moved from one position to the other by the hand-lever, which needs no lock of any sort.

In Fig. 1 is shown an improved form of beater-bar, the end of the bar R showing the full nature of the improvement. It is usual to make the outer face of the beater-bar flat, or conforming to the curvature of the periphery of the beater. In practice the bars of course rub against the load of material throughout their entire course through it. The effect is to load the faces of the bars with manure, and this accumulation causes great friction on the beater, and makes the machine draw very hard. My improvement consists in beveling the outer face of the bar, so as to give it clearance. The front edge of the bar thus becomes a cutting edge, which relieves the bar itself and those that follow it of friction against the advancing load of material.

Having thus described my invention, what I claim as new and desire to secure by Letters Patent, is:

1. In a manure spreader having a distributing beater, the combination of a retarder, a pair of links pivoted to said retarder and to a support a little back of the center of the beater, a pair of shorter arms also pivoted to the retarder, and a little forward of the beater center, and means for shifting said retarder from normal position forward of the beater to a position directly over it.

2. In a manure spreader having a beater at the rear end of it, the combination of a retarder, a pair of links pivoted to it and to a support a little back of the center of the beater, a pair of shorter arms pivoted to the retarder and at points a little forward of said center, a hand-lever, and a connection of said lever with one of said shorter arms, whereby the operator may shift the retarder from a position in front of the beater to a position directly over it.

3. In a manure spreader having a beater at the rear end, the combination of a retarder, a supporting bail therefor, a pair of link-blocks mounted on said bail, links connecting with said block some distance from the bail connection, separated bearings for the bail and said links, and a yielding connection of the retarder with said blocks.

4. Combined with the heads of a manure spreader beater, a beater bar provided with outwardly projecting spikes, the peripheral face of the bar being beveled tangentially, retreating backwardly with respect to the revolution of the beater, and having an outer forward cutting angle, substantially as described.

In testimony whereof I affix my signature in presence of two witnesses.

CHARLES W. WEST.

Witnesses:
 E. A. WEST,
 JULIA LARSON.